(No Model.)
A. WILHELM.
CULTIVATOR.
No. 320,607. Patented June 23, 1885.
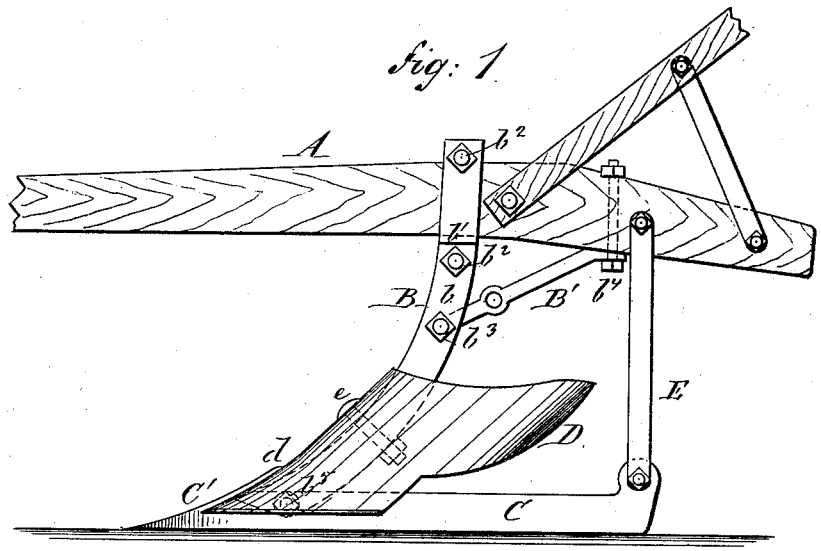
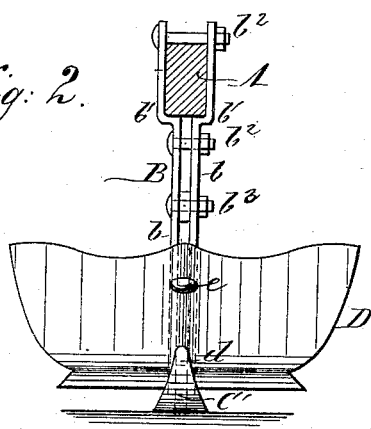
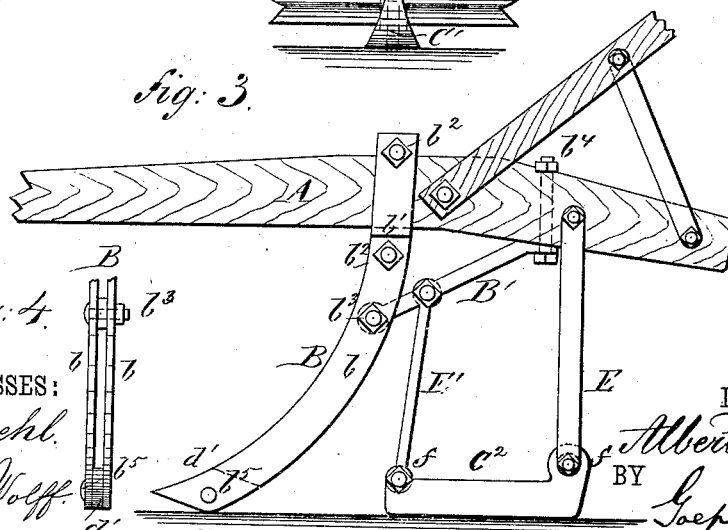
WITNESSES:
A. Schehl.
Ernst Wolff.
INVENTOR
Albert Wilhelm
BY
Goepel & Raegener
ATTORNEYS.

UNITED STATES PATENT OFFICE.

ALBERT WILHELM, OF PLEASANT HILL, TEXAS.

CULTIVATOR.

SPECIFICATION forming part of Letters Patent No. 320,607, dated June 23, 1885.

Application filed March 16, 1885. (No model.)

*To all whom it may concern:*

Be it known that I, ALBERT WILHELM, of Pleasant Hill, in the county of Washington and State of Texas, have invented certain new and useful Improvements in Cultivators, of which the following is a specification.

This invention has reference to an improved cultivator for turning over the soil and cutting the corn and cotton stalks; and the invention consists of a double plow-stock strapped to the beam, having a diamond-shaped point bolted thereto at the lower end, an inclined brace bolted to the beam and stock, and a sweep-stock attached by straps to the beam and brace.

In the accompanying drawings, Figure 1 represents a side elevation of my improved cultivator. Fig. 2 is a front view of the same. Fig. 3 is a side elevation showing the cultivator arranged with a sweep-stock, and Fig. 4 is a detail front view of the double plow-stock.

Similar letters of reference indicate corresponding parts.

A in the drawings represents the beam, B the double plow-stock, C the plow-bar, and D the double mold-board, of my improved cultivator. The double stock B is made of two bars, $b\ b$, which are provided with shoulders $b'$ at the upper end, so as to embrace the plow-beam A. The bars $b\ b$ are secured together by transverse bolts $b^2\ b^2$, above and below the beam, and by a third bolt, $b^3$, to an inclined brace, B', that is strapped at its rear end by a vertical bolt, $b^4$, to the beam. The lower end of the double plow-stock B is attached by a bolt, $b^5$, to the plow-bar C, which is made integral with its tapering point C', and of gradually-increasing width toward its sharpened cutting-edge, by which latter the corn and cotton stalks left in the ground are cut. The double mold-board D is fitted into a recess between the stock B and the point C', a tongue, $d$, of the point C' being extended in upward direction, as shown in Figs. 1 and 2. The upper part of the double mold-board D is attached by one or more bolts, $e$, to the double plow-stock, so that the same is held rigidly in position by the stock B, bar C, and recessed point C'. The point C' breaks up the ground to such a depth that the wings of the mold-board D have merely to lay over the soil, which makes the draft on the horses very light. The simple connection of the point C' with the mold-board D, and the absence of any bolts or nuts below the point of connection, has the advantage that the connection cannot be blocked up with the soil below the point, and that the same will not leave the ground or slip, but keep up an equal draft, steady the cultivator, and facilitate the handling of the same. The rear end of the plow-bar C is connected to the beam by an upright brace, E, which is bolted to the rear end of the beam A and bar C. The cultivator may also be used as a sweep-stock by detaching the plow-bar from the stock and replacing it by a sweep, $C^2$, which is attached by bolts $f$ to the brace E, and to an auxiliary brace, E', that connects the front end of the sweep $C^2$ with the inclined brace B'.

In place of the point C' a diamond-shaped point, $d'$, is attached to the lower end of the plow-stock B, and bolted thereto, as shown in Figs. 3 and 4. The diamond-shaped point renders the plow-stock solid at its lower end, and facilitates the cutting of the soil. The sweep $C^2$ steadies the stock in its motion through the soil, and facilitates the regular turning of the soil.

The advantages of my improved construction of cultivator and sweep-stock combined are that the cultivator can be furnished at a comparatively low price, as all the metal parts can be readily made by machinery, and connected without any turning of the stock, and that the work can be performed in an easy and reliable manner.

Having thus described my invention, I claim as new and desire to secure by Letters Patent—

In a combined cultivator and sweep-stock, the combination of a beam, a double stock strapped to the beam, and having a diamond-shaped point bolted to the lower end, an inclined brace bolted to the beam and stock, and a sweep-stock strapped to the beam and brace, substantially as set forth.

In testimony that I claim the foregoing as my invention I have signed my name in presence of two subscribing witnesses.

ALBERT WILHELM.

Witnesses:
J. A. ENGELKE,
I. R. STERN.